(12) United States Patent
Stipe

(10) Patent No.: US 8,279,552 B2
(45) Date of Patent: Oct. 2, 2012

(54) HERMETICALLY SEALING A HARD DISK DRIVE

(75) Inventor: Barry C. Stipe, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 54 days.

(21) Appl. No.: 12/820,945

(22) Filed: Jun. 22, 2010

(65) Prior Publication Data

US 2011/0310509 A1   Dec. 22, 2011

(51) Int. Cl.
*G11B 33/14* (2006.01)

(52) U.S. Cl. ..................................... 360/97.02

(58) Field of Classification Search .................... None
See application file for complete search history.

(56) References Cited

U.S. PATENT DOCUMENTS

| | | | |
|---|---|---|---|
| 6,525,899 B2 | 2/2003 | Hearn et al. | |
| 6,556,372 B2 * | 4/2003 | Hearn et al. | 360/97.02 |
| 6,721,128 B1 | 4/2004 | Koizumi et al. | |
| 7,119,984 B2 | 10/2006 | Macleod et al. | |
| 7,128,801 B2 * | 10/2006 | Smith et al. | 156/282 |
| 7,218,473 B2 * | 5/2007 | Bernett et al. | 360/97.02 |
| 7,362,540 B2 * | 4/2008 | Repphun et al. | 360/97.02 |
| 7,362,541 B2 * | 4/2008 | Bernett et al. | 360/97.02 |
| 7,773,338 B2 * | 8/2010 | Hayakawa et al. | 360/97.02 |
| 7,889,461 B2 * | 2/2011 | Stasiewicz et al. | 360/265.6 |
| 7,986,490 B2 * | 7/2011 | Hirono et al. | 360/97.02 |
| 8,014,167 B2 * | 9/2011 | Gunderson et al. | 361/800 |
| 2005/0264926 A1 * | 12/2005 | Burts-Cooper et al. | 360/97.02 |
| 2008/0212237 A1 | 9/2008 | Uefune et al. | |

OTHER PUBLICATIONS

Stefan, et al., "Antec MX-1 Actively Cooled Hard Drive Enclosure", (Sep. 7, 2009),1-1.
Ruthber, S. "Gas Infusion in Doubled Hermetic Enclosures", *Parts, Hybrids and Packaging, IEEE Transactions*, (Jun. 1977),110-116.

* cited by examiner

*Primary Examiner* — Mark Blouin

(57) ABSTRACT

A HDD comprising an internal base plate comprising a porous material and configured for attachment of internal components of the HDD, an external hermetic base plate comprising a non-porous material and configured to hermetically seal the HDD, an external attachment base plate comprising fastening features and an external hermetic cover hermetically sealed to the external hermetic base plate.

12 Claims, 3 Drawing Sheets

300

```
dispose an internal base plate adjacent to an external hermetic base
plate, wherein the internal base plate comprises a porous material and
the external hermetic base plate comprises a non-porous material
310
```
↓
```
dispose an external attachment base plate adjacent to the external
hermetic base plate
320
```
↓
```
dispose a low-density gas within said hard disk drive
330
```
↓
```
hermetically seal an external hermetic cover to the external hermetic
base plate to hermetically seal the low-density gas within the hard disk
drive
340
```

FIG. 3

HERMETICALLY SEALING A HARD DISK DRIVE

BACKGROUND

Typically, hard disk drives (HDDs) are sealed to prevent contaminants from entering the HDD and/or prevent gas within the HDD from escaping. There can be about fifteen non-hermetic seals, all of which use polymers (e.g., elastomer gaskets and adhesive tape). Also, a breather filter is utilized to equalize interior pressure with exterior pressure. Unfortunately, a true hermetic seal can not be established using traditional sealing methods. Accordingly, a high permeation rate of gas can result. For example, the solubility of water vapor and diffusion coefficients of a low-density gas (e.g., helium) are very high.

Moreover, a traditional die-cast aluminum base plate may be too porous to contain a low-density gas for the lifetime of the HDD. Also, with aluminum-to-aluminum and aluminum-to-steel hermetic joining, it is difficult and expensive to create a true hermetic seal.

BRIEF DESCRIPTION OF THE DRAWINGS

FIG. 3 illustrates an example of a flow chart of a method for hermetically sealing a HDD, in accordance with an embodiment of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
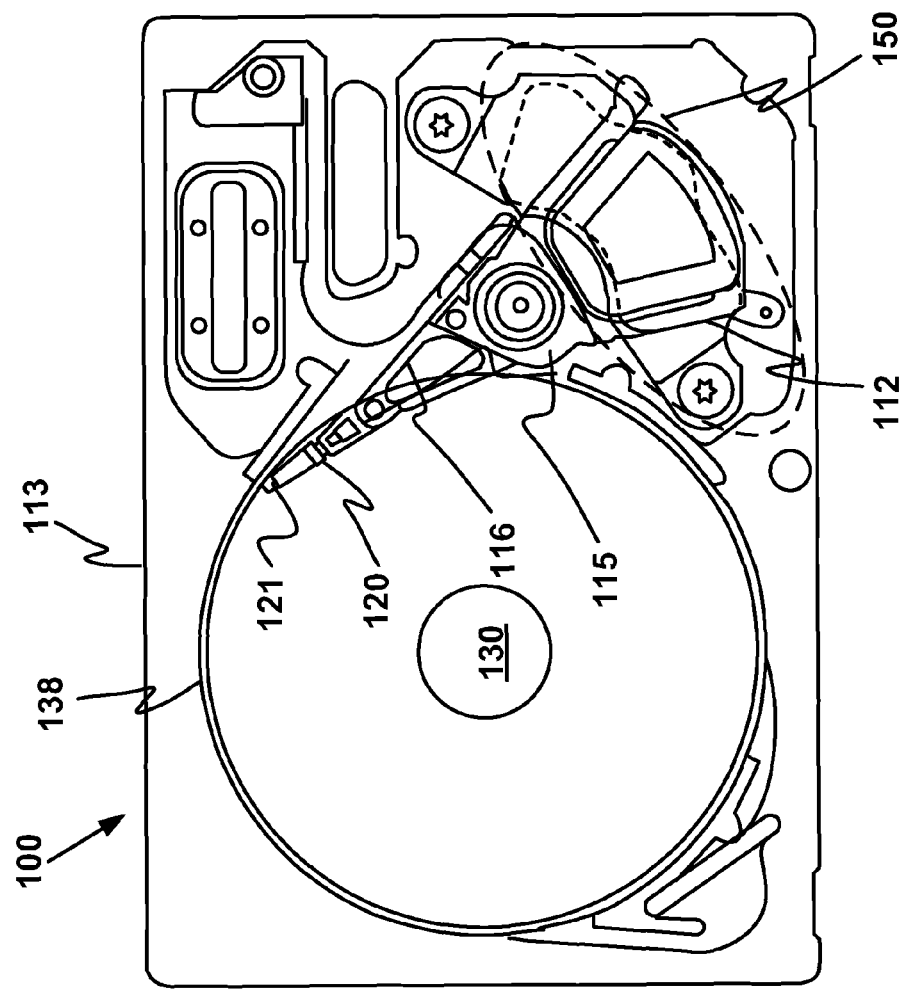
FIG. 1 illustrates an example of a HDD, in accordance with an embodiment of the present invention.

With reference now to FIG. 1, a schematic drawing of one embodiment of an information storage system including a magnetic hard disk file or HDD 100 for a computer system is shown, although only one head and one disk surface combination are shown. What is described herein for one head-disk combination is also applicable to multiple head-disk combinations. In other words, the present technology is independent of the number of head-disk combinations.

In general, HDD 100 has an internal base plate 113 and an internal cover (not shown). In one embodiment, internal housing 113 contains a disk pack having at least one media or magnetic disk 138. The disk pack (as represented by disk 138) defines an axis of rotation and a radial direction relative to the axis in which the disk pack is rotatable. HDD 100 also includes an external hermetic base plate, an external hermetic cover, and an external attachment base plate (not shown in FIG. 1) that are described in detail below with reference to FIG. 2.

A spindle motor assembly having a central drive hub 130 operates as the axis and rotates the disk 138 or disks of the disk pack in the radial direction relative to internal base plate 113. An actuator assembly 115 includes one or more actuator arms 116. When a number of actuator arms 116 are present, they are usually represented in the form of a comb that is movably or pivotally mounted to base/housing 113. A controller 150 is also mounted to internal base plate 113 for selectively moving the actuator arms 116 relative to the disk 138. Actuator assembly 115 may be coupled with a connector assembly, such as a flex cable to convey data between arm electronics and a host system, such as a computer, wherein HDD 100 resides.

In one embodiment, each actuator arm 116 has extending from it at least one cantilevered integrated lead suspension (ILS) 120. The ILS 120 may be any form of lead suspension that can be used in a data access storage device. The level of integration containing the slider 121, ILS 120, and read/write head is called the Head Gimbal Assembly (HGA).

The ILS 120 has a spring-like quality, which biases or presses the air-bearing surface of slider 121 against disk 138 to cause slider 121 to fly at a precise distance from disk 138. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 116 opposite the head gimbal assemblies. Movement of the actuator assembly 115 by controller 150 causes the head gimbal assembly to move along radial arcs across tracks on the surface of disk 138.

Figure 2:
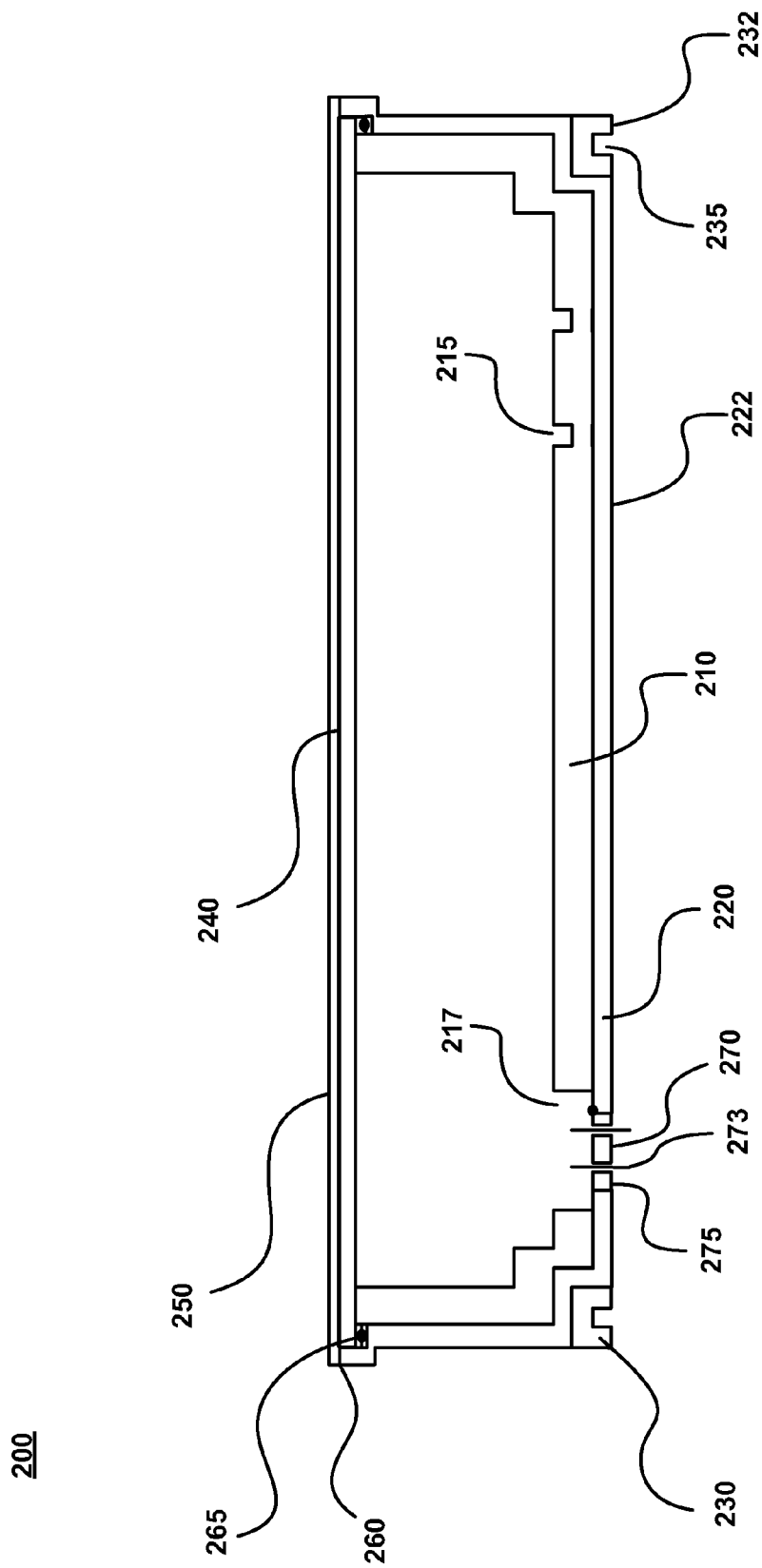
FIG. 2 illustrates an example of a HDD, in accordance with an embodiment of the present invention.

FIG. 2 depicts HDD 200, in accordance to various embodiments. HDD 200 includes internal base plate 210, external hermetic base plate 220, external attachment base plate 230, internal cover 240 and external hermetic cover 250.

Internal base plate 210 is configured for attachment and mechanical support of HDD components (e.g., actuator assembly 115) within HDD 200. In particular, internal base plate 210 includes internal attachment features 215 adapted for coupling HDD components within HDD 200. Attachment feature 215 can be, but is not limited to, a threaded screw hole. In various embodiments, HDD 200 includes a plurality of internal attachment features 215 that are in any orientation that is compatible with fastening and/or supporting HDD components.

Internal base plate 210 is comprised of a porous material (e.g., cast aluminum). Gas, such as, but not limited to, ambient air may not permeate through the material of internal base plate 210, however, low-density gas, such as, but not limited to helium, can permeate through the material of the internal base plate. In various embodiments, internal base plate 210 can include openings (e.g., opening 217) on the bottom and/or sides. Openings can provide extra space to meet form factor requirements. It should be appreciated that internal base plate 210 cannot (or is not intended to) hermetically seal gas within HDD 200.

The permeation rate of a gas through a solid is given by the equation $$Q = DbPA/h \qquad \text{(Equation 1)}$$

with the permeation constant K give by K=Db and wherein:

Q is the permeation rate, D is the diffusion coefficient, b is the solubility, P is the pressure difference across the solid, A is the cross-sectional area of the solid, and h is the thickness of the solid.

External hermetic base plate 220 (in combination with external hermetic cover 250) is configured to hermetically seal low-density gas within HDD 200. External hermetic base plate 220 comprises a non-porous material (e.g., stamped steel).

External hermetic base plate 220 is disposed adjacent to internal base plate 210. External hermetic base plate 220 and internal base plate 210 can be attached to each other via adhesive, epoxy or the like.

Hermetic sealing can reduce magnetic spacing, reduce cost, increase track density, reduce power consumption, and increase HDD performance. Hermetic sealing allows for humidity control and control of humidity driven corrosion of heads and disks which can result in thinning or elimination of protective overcoats on the head and disk. Moreover, with in-situ head burnishing, hermetic sealing can reduce magnetic spacing even further.

Hermetic sealing can also eliminate altitude sensitivity of fly-height. Moreover, with the use of low-density gas, hermetic sealing can reduce drag and spindle power consumption (e.g., by a factor of about 2 or 3), allow for higher spindle rates (e.g., 40 to 50%). Low-density gas can allow for reduced turbulence and track mis-registration (e.g., by a factor in the range of 2 to 5), increased actuator heat sinking (actuator power may be increased by a factor of two without overheating). Low-density gas can also significantly reduce the cost of some HDDs with the use of fewer, larger disks (30% to 65% higher capacity per disk without reducing performance) or by avoiding the use of certain components such as milli-actuator, shrouding, breather filter and the like.

Feedthrough 270 is configured for electrical connection to HDD components in HDD 200. Feedthrough 270 is hermetically sealed with external hermetic base plate 220. In one embodiment, feedthrough 270 comprises the same material (e.g., stamped steel) as external hermetic seal 220. In another embodiment, feedthrough 270 is laser welded (or soldered) to external hermetic seal 200 to form a hermetic steel-to-steel joint 275.

Feedthrough 270 includes at least one pin 273 for electrical connection to HDD components. In one embodiment, feedthrough 270 includes a glass and/or ceramic bead placed around pin(s) 273 to hermetically seal pin(s) 273 in feedthrough 270. It should be appreciated that feed through 270 can include any number of pins (e.g., 273) in any orientation that is compatible with electrical connection to HDD components. It should also be appreciated that feedthrough 270 could be attached to the external plate during manufacturing of HDD 200 or could be considered part of (or integral to) external hermetic base plate 220.

External attachment base plate 230 is configured to facilitate in external fastening/attaching of HDD 200. External hermetic base plate 220 covers the exterior of internal base plate 210, therefore, internal base plate 210 cannot be used for external fastening/attaching of HDD 200. Accordingly, external attachment base plate 230 is used. External attachment base plate 230 includes external attachment feature 235. External attachment features 235 can be, but are not limited to a threaded screw holes. In various embodiments, external attachment base plate 230 can be used for attaching an external component (e.g., printed circuit board) to of HDD 200 and/or attaching HDD 200 to another physical structure.

External attachment base plate 230 is adjacent to external hermetic base plate 220. External attachment base plate 230 can be attached to external hermetic base plate 220 by, but not limited to, adhesive or epoxy. In one embodiment, external attachment base plate 230 is a ring disposed around the periphery of external hermetic base plate 220. In another embodiment, external attachment base plate 230 comprises the same material (e.g., aluminum) as internal base plate 210.

In one embodiment, external attachment base plate 230 includes a bottom surface 232 that is coplanar with bottom surface 222 of external hermetic base plate 220. In another embodiment, external attachment base plate 230 is inset within external hermetic base plate 220. Accordingly, external attachment base plate 230 does not add to the height of HDD 200.

Internal cover 240 is configured to seal low-density gas within HDD 200 during testing of HDD 200. Internal cover 240 is non-hermetically sealed to external hermetic base plate 220. In various embodiments, screws (not shown) and metal tape (not shown) can be used to facilitate in non-hermetically sealing internal cover to external hermetic base plate 220. In one embodiment, internal cover 240 is sealed to external hermetic base plate 220 via seal 265 (e.g., O-ring).

Internal cover 240 is sealed to external hermetic base plate 220 to ensure that ambient air and/or contaminants cannot permeate into and/or low-density gas escape HDD 200 through a possible passageway between external hermetic base plate 220 and internal base plate 210. It should be appreciated that, during drive testing, internal cover 240 is removably sealed to external hermetic base plate 220.

Internal cover 240 does not provide a hermetic seal for HDD 200. Depending on the design of HDD 200, internal cover 240 may have openings for screws, internal access, etc. that are covered with metalized tape so there is not a hermetic case. It may be possible in some designs to remove the internal cover when the hermetic cover is attached or to have a single cover design where the O-ring is used during manufacture but there is an extension (e.g., lip) that is laser welded at the end. This assumes that there are not any non-hermetic seals on the surface of this single cover design. In one embodiment, internal cover 240 comprises the same type of material (e.g., aluminum) as internal base plate 210.

External hermetic cover 250 is configured to be hermetically sealed to external hermetic base plate 220. After HDD 200 has been tested at manufacturing and determined to be functioning properly, a low-density gas is hermetically sealed within HDD 200 via external hermetic cover 250 and external hermetic base plate 220. In one embodiment, a steel-to-steel joint 260 is laser welded between external hermetic cover 250 and external hermetic base plate 220. In another embodiment, external hermetic cover 250 is adjacent and attached to internal cover 240 by, but not limited to, adhesive or epoxy.

FIG. 3 illustrates a flow chart of a method 300 for hermetically sealing a hard disk drive, in accordance with an embodiment of the present invention.

At step 310, an internal base plate is disposed adjacent to an external hermetic base plate, wherein the internal base plate comprises a porous material and the external hermetic base plate comprises a non-porous material.

At step 320, an external attachment base plate is disposed adjacent to the external hermetic base plate. In one embodiment, the external attachment base plate is disposed adjacent to the external hermetic base plate such that a bottom surface of the external attachment plate is co-planar with a bottom surface of the external hermetic base plate.

At step 330, a low-density gas is disposed within the HDD. In one embodiment, the low-density gas is helium.

At step 340, an external hermetic cover is hermetically sealed to the external hermetic base plate to hermetically seal the low-density gas within the HDD. In one embodiment, the external hermetic cover is steel-to-steel hermetically joined to the external hermetic base plate. In another embodiment, the external hermetic cover is laser welded to the external hermetic base plate.

Various embodiments of the present invention are thus described. While the present invention has been described in particular embodiments, it should be appreciated that the present invention should not be construed as limited by such embodiments, but rather construed according to the following claims.

What is claimed is:

1. A hard disk drive comprising:
    an internal base plate comprising a porous material and configured for attachment of internal components of said hard disk drive;
    an external hermetic base plate comprising a non-porous material and configured to hermetically seal said hard disk drive, wherein said internal base plate is adjacent to a first side of said external hermetic base plate;
    an external attachment base plate comprising fastening features, wherein said external attachment base plate is adjacent to a second side of said external hermetic base plate opposite said first side of said external hermetic base plate, wherein said external attachment base plate comprises a bottom surface that is coplanar with a bottom surface of said external hermetic base plate, and wherein said external attachment base plate comprises an external attachment feature; and
    an external hermetic cover hermetically sealed to said external hermetic base plate, wherein said internal base plate and said internal components of said hard disk drive are hermetically sealed within said hard disk drive.

2. The hard disk drive of claim 1, wherein said porous material comprises cast aluminum.

3. The hard disk drive of claim 1, wherein said non-porous material comprises stamped steel.

4. The hard disk drive of claim 1, comprising:
    a low-density gas hermetically sealed within said external hermetic base plate and said external hermetic cover.

5. The hard disk drive of claim 4, wherein said low-density gas is helium.

6. The hard disk drive of claim 1, wherein a hermetic seal between said external hermetic base plate and said external hermetic cover comprises a steel-to-steel hermetic joining.

7. The hard disk drive of claim 1, comprising:
    a feedthrough hermetically sealed to said external hermetic base plate, wherein said feed through comprises said non-porous material.

8. The hard disk drive of claim 1, wherein said external attachment base plate comprises a ring disposed along a periphery of said external hermetic base plate.

9. A method for hermetically sealing a hard disk drive, said method comprising:
    disposing an internal base plate adjacent to an external hermetic base plate, wherein said internal base plate comprises a porous material and said external hermetic base plate comprises a non-porous material, wherein said internal base plate is adjacent to a first side of said external hermetic base plate;
    disposing an external attachment base plate adjacent to a second side of said external hermetic base plate opposite said first side of said external hermetic base plate, wherein a bottom surface of said external attachment plate is coplanar with a bottom surface of said external hermetic base plate, and wherein said external attachment base plate comprises an external attachment feature;
    disposing a low-density gas within said hard disk drive; and
    hermetically sealing an external hermetic cover to said external hermetic base plate to hermetically seal said low-density gas within said hard disk drive, wherein said internal base plate and internal components of said hard disk drive are hermetically sealed within said hard disk drive.

10. The method of claim 9, said disposing said low-density gas within said hard disk drive comprises:
    disposing helium within said hard disk drive.

11. The method of claim 9, wherein said hermetically sealing said external hermetic cover to said external hermetic base plate comprises:
    steel-to-steel hermetic joining said external hermetic cover to said external hermetic base plate.

12. The method of claim 9, wherein said hermetically sealing said external hermetic cover to said external hermetic base plate comprises:
    laser welding said external hermetic cover to said external hermetic base plate.

* * * * *